United States Patent [19]
Vuletic

[11] Patent Number: 6,120,582
[45] Date of Patent: Sep. 19, 2000

[54] PROCESS FOR TREATING THE SCRUBBING WATER FROM THE GAS SCRUBBING PROCESS IN AN IRON ORE REDUCTION PLANT

[75] Inventor: Bogdan Vuletic, Duessledorf, Germany

[73] Assignee: Deutsche Voest-Alpine Industrieanlagenbau GmbH, Germany

[21] Appl. No.: 09/180,426

[22] PCT Filed: Apr. 30, 1997

[86] PCT No.: PCT/DE97/00895

§ 371 Date: Jun. 3, 1999

§ 102(e) Date: Nov. 9, 1998

[87] PCT Pub. No.: WO97/43221

PCT Pub. Date: Nov. 20, 1997

[30] Foreign Application Priority Data

May 10, 1996 [DE] Germany ............................ 196 20 310

[51] Int. Cl.[7] .................................................. B01D 53/14
[52] U.S. Cl. ............................... 95/177; 95/192; 95/194; 95/195; 95/197; 95/205
[58] Field of Search ............................... 95/174, 176, 177, 95/179, 180, 186, 187, 192, 193, 194, 195, 197, 199, 200, 202, 204, 205

[56] References Cited

U.S. PATENT DOCUMENTS

| | | | |
|---|---|---|---|
| 3,315,443 | 4/1967 | Marino | 95/205 |
| 3,396,514 | 8/1968 | Hurst et al. | 95/149 |
| 3,541,761 | 11/1970 | Pike | 95/200 |
| 4,152,123 | 5/1979 | Hegemann et al. | 95/197 |
| 4,305,909 | 12/1981 | Willett et al. | 95/199 |
| 4,330,511 | 5/1982 | Nelson, Jr. et al. | 95/195 |
| 4,478,802 | 10/1984 | Honkaneimi et al. | 95/195 |
| 4,632,766 | 12/1986 | Firnhaber et al. | 210/752 |
| 4,854,946 | 8/1989 | Heijwegen et al. | 95/197 |
| 5,225,086 | 7/1993 | Vuletic . | |

FOREIGN PATENT DOCUMENTS 40 32 288 A1  4/1992  Germany .

*Primary Examiner*—Duane S. Smith
*Attorney, Agent, or Firm*—Marshall & Melhorn

[57] ABSTRACT

A process is disclosed for treating the scrubbing water from the gas scrubbing process in an iron ore reduction plant. The scrubbing water is brought into direct contact with the gas in two gas scrubbers arranged in two successive scrubbing stages at the gas-side, is withdrawn from the gas scrubbers and is supplied again to the gas scrubbers after the solids it contains are separated, and after it is treated and cooled. The scrubbing water is separately withdrawn from the two scrubbing stages and only the scrubbing water from the first scrubbing stage is largely freed from solids in a thickener, then led into a warm water container. The scrubbing water from the second scrubbing stage is directly led into a return water container in which it releases carbon dioxide-rich flash gas led into the scrubbing water in the warm water container to enrich it with carbon dioxide. The scrubbing water from the warm water container is cooled in a heat exchanger, then fed back to the gas scrubbers of the two scrubbing stages together with the scrubbing water from the return water container. Moreover, part of the carbon dioxide-rich scrubbed gas or part of the carbon dioxide-rich water contained in the return water container may also be led into the warm water container to enrich the scrubbing water in the warm water container with carbon dioxide.

12 Claims, 1 Drawing Sheet

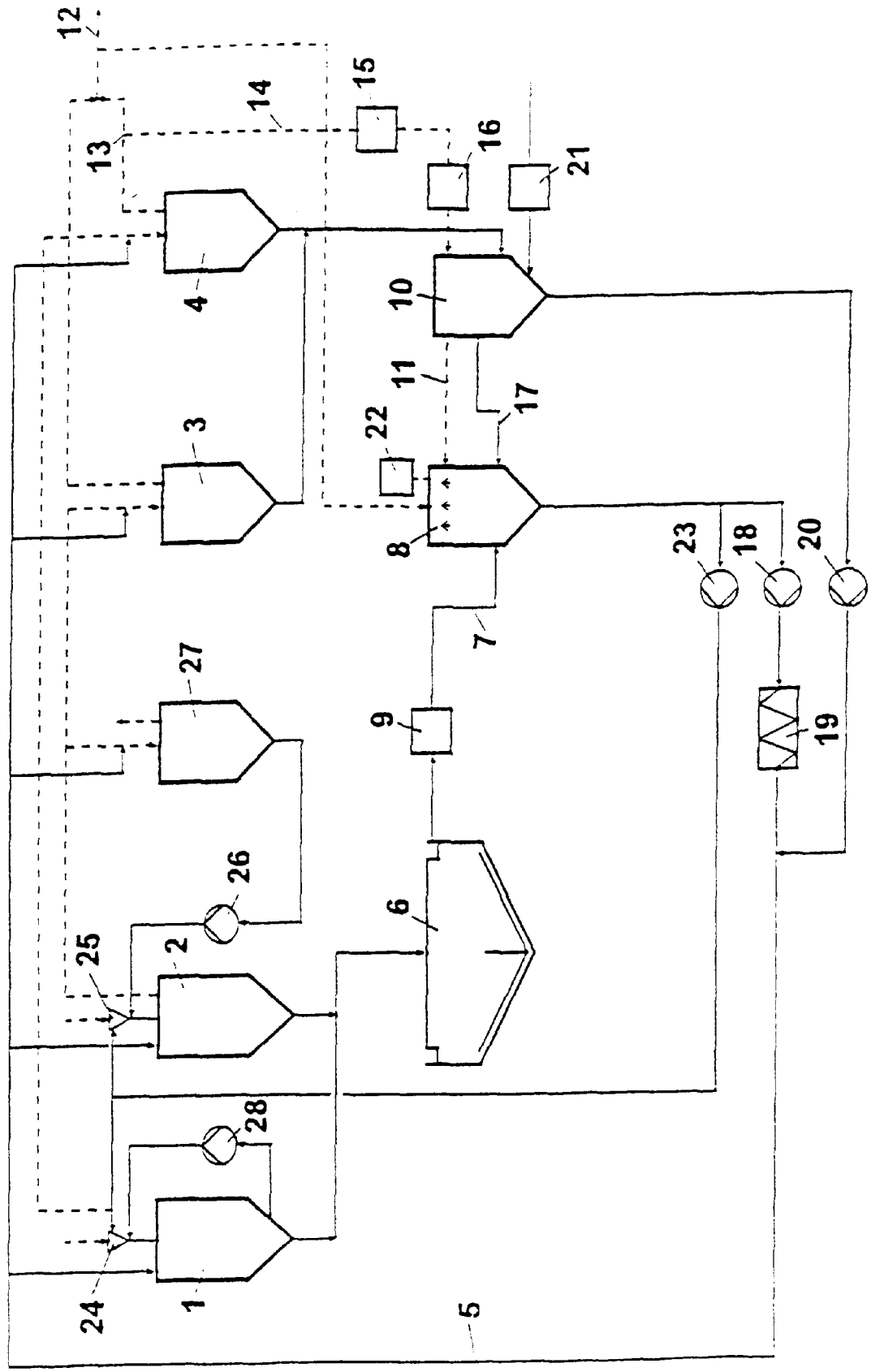

PROCESS FOR TREATING THE SCRUBBING WATER FROM THE GAS SCRUBBING PROCESS IN AN IRON ORE REDUCTION PLANT

BACKGROUND OF THE INVENTION

1. Field of the Invention

The invention relates to a process for treating washing water from a gas washing operation of an iron ore reduction plant.

2. Description of the Prior Art

From German Printed Publication 40 32 288 C2, a process for treating washing water from a gas washing operation of an iron ore reduction plant has become known, with which process the washing water, in one or several gas washers, is brought into direct contact with the crude gas, is withdrawn from the gas washer, and, after a separation of solids, is fed again to the gas washer in cooled-off form. To this end, the washing water largely freed from solids in a first thickener is, via a warm water basin, led into a cooling tower in which the water is cooled and separation of dissolved carbon dioxide, enrichment with oxygen, conversion of the calcium and magnesium hydrogen-carbonates into carbonates and of the iron bicarbonate as well as the iron sulphate into iron (III)hydroxide are carried out. Then, such chemically destabilized washing water will, in a second series connected thickener and freed from the newly formed and residual solids by an addition of flocculants and coagulants, be chemically stabilized and, via a cold water basin, fed back to the gas washer.

Gas from an iron ore reduction plant contains large quantities of freshly reduced, very reactive iron particles. A contact with the carbon dioxide-saturated washing water will give rise to iron bicarbonate. The iron particles also react, on sulphate ions, to become iron sulphate. In this way, a large part of the solid iron particles is converted to a soluble form. By expulsion of carbon dioxide and enrichment of the washing water with oxygen in the cooling tower, iron bicarbonate and iron sulphate will give rise to iron(III) hydroxide which is insoluble in water and which precipitates in the form of flocs. The precipitated iron(III)hydroxide flocs furthermore react on the oxygen present in the water and form solid-state iron oxides. In case of a melt reduction plant, the gas additionally contains a large quantity of calcium and magnesium oxide particles which, with the carbon dioxide-containing washing water, form bicarbonates that, after aeration in the cooling tower, precipitate as carbonates.

Such water having lost its chemical equilibrium and showing strong deposition tendencies is, from the cooling tower, fed to the second thickener. Due to an increased residence time, the solid precipitating procedures are terminated in the second thickener and the water is stabilized before it will again be used for a gas washing operation. In this way, the deposition problems in the critical and cleaning-problematic washer and operative area which is operated under elevated pressure of combustible and toxic gases are successfully solved. In the cooling tower area which, for cleaning and maintenance, is periodically turned off cell-by-cell, the solid depositions, however, are considerable. Already after a relatively short period of time, the water distributing systems and the packing of the cooling tower become fully overgrown and the depositions become so hard that the packing must be renewed several times a year. Instead of standard cooling towers which are used for the cooling of washing water from comparable gas washing operations, special cooling towers, thus, were developed so as to extend the time intervals between the cleaning cycles and to reduce the amount of maintenance. These special cooling towers are very big cooling towers with but a few built-ins and with cooling tower cups mounted at high level so as to enable discharging of the washing water towards the second thickener by free descent, with special nozzles for effecting irrigation of the water under a higher pressure, and including a variety of other measures so as to reduce the amount of cleaning and to shorten the times required for cleaning.

However, the amounts of cleaning and maintenance are still very great; furthermore, energy consumption is significantly higher than in case of a usual cooling tower and the specific investment costs for the cooling sawer likewise are very high. Moreover, space demand for two large thickeners, a big cooling tower, a pump station, and conduits is very high so that, in many cases, it is very problematic to accommodate the plant in the available space.

Another problem with that known process is the outward transfer of relatively large quantities of carbon monoxide into the atmosphere since the washing water in the gas washers which are operated under higher pressure comes into direct contact with the gases that, predominantly, are made up of carbon monoxide and carbon dioxide. Especially large gas quantities are, with the substantially colder backward-flow water from the second washing stage, into the atmosphere. Part of those gases evades in the first thickener which is operated under atmospheric pressure and the rest is expulsed in the cooling tower.

SUMMARY OF THE INVENTION

It is, thus, the object of the present invention to improve the known process for treating washing water from a gas washing operation of an iron ore reduction plant, the washing water, in gas washers arranged in two washing stages connected in tandem on the side of the gas, being brought into direct contact with the gas; being withdrawn from the gas washers, and, after a separation of solids, being fed again to the gas washers in conditioned and cooled-off form, in such a way that depositions are, with the exception of the thickener provided for that purpose, avoided in the entire washing water circuit to the greatest possible extent and outward transfer of toxic carbon monoxide into the atmosphere is considerably reduced. Furthermore, the investment and operating costs as well as the space demand are to be diminished.

According to the invention, such object is solved by the features indicated in the characterizing part of claim 1. Advantageous developments of the process according to the invention result from the Subclaims.

With the process according to the invention, it is only the washing water from the first washing stage of a gas washing operation that is led through a thickener for sedimentation of solids and that, then, is cooled in an indirect heat exchanger and the backward-flow water diluted with water vapor condensate as well as oversaturated with carbon dioxide after stress-relief is, from the second washing stage, added to that forward-flow water in uncooled form without separation of solids and without communication with the atmosphere so that salts dissolved in water will remain in form of a solution and will not precipitate as depositions.

Since the gases from an iron ore reduction melting plant contain freshly reduced and very reductive iron particles as well as freshly calcined calcium and magnesium oxides, the backward-flow water from the first stage of the gas washing operation is nearly saturated with the bicarbonates thereof and it has to be striven for to keep those salts in form of a solution and to shift the state of equilibrium of the forward-flow water out of the deposition area to such an extent that there will be no depositions in the water circuit. In order to attain this end, exhalation of carbon dioxide is, according to the invention, minimized; taking-up of oxygen is avoided; the water, after partial degasification of carbon dioxide is, in the thickener, again enriched with carbon dioxide by gas rich in carbon dioxide under elevated pressure, and the forward-flow water is, in an indirect heat exchanger, cooled off without contacting the atmosphere and diluted by admixing the backward-flow water considerably diluted with water vapor condensate and fresh water and oversaturated with carbon dioxide as well as coming from the second washing stage and the pH value of said forward-flow water is reduced.

The water level in the overflow channel is, via a control device, set so as to be high from the thickener to the warm water tank, whereby minimum enrichment of the overflow water with oxygen and minimum evasion of carbon dioxide in the overflow area of the thickener are attained in order to keep dissolved salts such as calcium, magnesium, and iron bicarbonates in form of a solution. The level control device is, via a conduit, connected with the closed warm water tank in which the washing water largely freed from solids is gassed with a gas rich in carbon dioxide in order to again balance the carbon dioxide economy of the washing water fed from the thickener, which economy has become slightly unbalanced.

The gas released from the oversaturated water from the second washing stage is, after partial stress-relief in a backward-flow water tank and for gassing the washing water situated in the warm water tank, led into said washing water. According to need, a requisite quantity of the washed top or export gas rich in carbon dioxide and led out of the second washing stage may be added to that gas. Both tanks are maintained under slight overpressure; the warm water tank, preferably, is maintained at the pressure of ca. 0.15 bar of the export gas conduit and the backward-flow water tank, preferably, is maintained with a somewhat higher pressure in order to achieve dissolution of carbon dioxide in the washing water situated in the warm water tank already before reaching the heat exchanger, to prevent oxygen from entering, and to lead off non-dissolved gas into the export gas conduit or to a flare system.

The backward-flow water from the second washing stage, said water containing relatively few and but very fine solids and being but a few degrees Centigrade warmer than the forward-flow water, is preferably saturated with carbon dioxide and diluted with water vapor condensate and, after having left the washing stage, is led into the closed backward-flow water tank, which is under slight overpressure, and added to the forward-flow water without pretreatment. By that feed, dilution and further enrichment of the washing water led off from the thickener with carbon dioxide are attained. A smaller part of the water from the backward-flow water tank is added into the lower part of the warm water tank and a larger part thereof is added behind the indirect heat exchanger. Since receptivity of water for carbon dioxide, with lower temperatures and higher pressure, will considerably increase, it, thereby, is achieved that all of the carbon dioxide fed with the water from the backward-flow water tank remains, in the forward-flow water, in form of a solution. Leading of a smaller part of said water into the lower portion of the warm water tank is to further enrich and dilute the washing water ahead of the indirect heat exchanger with carbon dioxide in order to avoid depositions in the heat exchanger itself.

In compliance with a further advantageous development of the process according to the invention, part of the washing water stabilized in the warm water tank with carbon dioxide is, in uncooled form, pumped to the quenching zone of the first washing stage, whereby the quenching procedure of the hot gases is accelerated, the temperature level in the first washing stage is augmented, and condensation of large vapor quantities is moved out of the first into the second washing stage. In the second washing stage, the formed condensate serves as water of dilution, which stage is entered, with the gases from the first washing stage, only by small quantities of fine, nearly exclusively degassed carbon particles insoluble in water, by which particles an enrichment of the water with dissolved salts hardly occurs. The condensate replaces a larger quantity of make-up water. The process, thus, utilizes part of the waste warmness of the proceeding for generating fully desalted make-up water; the total quantity of the water flowing to the thickener becomes smaller and very much less toxic carbon monoxide is dissolved and outwardly transferred into the atmosphere.

For temperature regulation and because of the double safeguarding of the water supply of the quenching zone critical temperature wise and belonging to the first washing stage, backward-flow water from one of the cooling gas washers located subsequently to the first washing stage is directly led into the quenching zone of the first washing stage. Moreover, washing water from the cone of a gas washer of the first washing stage may be directly pumped back into the quenching zone thereof.

An augmentation of the temperature of the gas escaping from the first washing stage by some degrees Centigrade could almost suffice to renounce gassing with gas rich in carbon dioxide.

In the quenching zone of the first washing stage, where the largest quantity of vapor is, by evaporation of washing water, produced in contact with the hot gases and the water is very well warmed, the wear is greater than the depositions so that the deposited layers will be carried away and discarded in the thickener as solids. Since the washing water is relatively well warmed in the first washing stage, the warmness may be led off in effective and environment-friendly manner into an indirect water-air or water-water heat exchanger.

The gas rich in carbon dioxide and not separated from the washing water as well as introduced into the warm water tank may be led into the export gas conduit or to a flare system and, thus, can be disposed of in environment-friendly manner.

Advantageously, fresh water is additionally fed to the backward-flow water tank in order to lead the circulating washing water still farther out of scaling range.

BRIEF DESCRIPTION OF THE DRAWING

In the following, the invention will be explained in more detail on the basis of one embodiment represented in the FIGURE. The latter is a diagrammatic sketch of a gas washing installation operating in compliance with the process according to the invention.

DESCRIPTION OF THE REFERRED EMBODIMENTS

The represented embodiment refers to cleaning of those gases which are generated in an iron ore reduction plant made up of a reduction shaft kiln and a meltdown gasifier.

The gas generated by the reduction shaft kiln is designated as top gas and the gas generated by the meltdown gasifier is designated as gasifier gas. The washing installation shows two stages each having gas washers, there being provided, in the first washing stage, a gas washer 1 for washing the top gas and a gas washer 2 for washing the gasifier gas as well as, in the second washing stage, a gas washer 3 for washing the gasifier gas and a gas washer 4 for washing the top gas. The gas washers 1 and 4 and the gas washers 2 and 3 are each, gaswise, connected in tandem. The washing water is, via a forward-flow water conduit 5, directly fed to all gas washers 1 to 4. The gas washers 1 and 2 of the first stage and the gas washers 3 and 4 of the second stage are, in respect of directing of the washing water, each connected in parallel with one another.

The washing water led out of the gas washers 1 and 2 of the first washing stage and loaded with contaminations from the top gas and the gasifies gas is led into a thickener 6 in which the solids settle down. Then, the washing water largely freed from the solids is, via an overflow of the thickener 6 and an inlet conduit 7, led into the lower part of a warm water tank 8. A control device 9 in the inlet conduit 7 controls the water in the overflow channel of the thickener 6 such that it will be set at a high level.

Hereby, it is achieved that but minimum enrichment of the overflow water with oxygen and minimum evasion of carbon dioxide occur in the overflow portion of the thickener 6.

The mouth of the inlet conduit 7 in the warm water tank 8 is situated in the lower part thereof so that gases accumulating in the upper part of the warm water tank 8 which is under slight overpressure cannot evade into the atmosphere through the inlet conduit 7. That is why the pressure of the water column across the mouth of the inlet conduit 7 should amount at least to 1.5 times the gas pressure in the warm water tank 8.

The washing water led off from the gas washers 3 and 4 of the second washing stage enters a backward-flow water tank 10. That washing water is rich in carbon dioxide and, for a considerable part, made up of condensed water vapor so that it is desalted to a large extent. The backward-flow water tank 10 does not include a ventilation of its own and degasification gases predominantly made up of carbon dioxide accumulate in the upper part thereof. The backward-flow water tank 10 is under somewhat higher overpressure than the warm water tank 8 so that the carbon dioxide accumulating in the upper part of the backward-flow water tank 10 can, via an overflow conduit 11, be led into the warm water tank 8 below the water surface. The pressure in the backward-flow water tank 10 is determined by the depth of the mouth of the overflow conduit 11 below the water surface in the warm water tank 8 and by the gas pressure in said warm water tank 8, which gas pressure, since said tank communicates with the export gas conduit 12 leading off the washed gases, amounts to about 0.15 bar. Because of the carbon dioxide fed to the warm water tank 8 via the overflow conduit 11, the washing water in the warm water tank 8 is enriched with carbon dioxide. But if the quantity of the gas escaping from the backward-flow water of the gas washers 3 and 4 of the second washing stage should not suffice to enrich the washing water in the warm water tank 8 with carbon dioxide, the required quantity would be branched off from the washed top gas rich in carbon dioxide from the conduit 13 and, possibly, from the export gas from the conduit 12 via a conduit 14, in which a flow-through measuring device 15 and a flow-through control armature 16 regulated by said device can be found, and would be admixed with the gas accumulating in the upper part of the backward-flow water tank 10. Further enrichment of the washing water situated in the warm water tank 8 with carbon dioxide is effected by admixture of the water oversaturated with carbon dioxide and coming from the backward-flow water tank 10, said water being, through an overflow conduit 17, led into the lower part of the warm water tank 8. Due to the elevated pressure in the lower part of the warm water tank 8, only a small part of the carbon dioxide will escape from the thus admixed backward-flow water and move upwards.

The warm washing water thus enriched with carbon dioxide is, through forward-flow water pump 18, pumped from the warm water tank 8 via an indirect heat exchanger 19 and the forward-flow water conduit 5 to the gas washers 1 to 4. The main part of the water diluted with water vapor condensate, oversaturated with carbon dioxide, and coming from the backward-flow water tank 10 is added to the forward-flow water cooled off in the heat exchanger 19 by means of a pump 20.

Addition of fresh water is effected via a control armature 21 to the backward-flow water tank 10, said addition being effected in dependency on a level measuring device 22 in the warm water tank 8. A pump 23 connected to the warm water tank 8 supplies quenching zones 24 and 25 of the gas washers 1 and 2 of the first washing stage with warm washing water from the warm water tank 8 in direct manner. A pump 26 transports the backward-flow water from a cooling gas washer 27 which is located subsequently to the gas washer 2 for the gasifier gas on the side of the gas to the temperature-critical quenching zone 25 of the gas washer 2 of the first washing stage and a pump 28 transports the washing water from the cone of the gas washer 1 for the top gas of the first washing stage back to its quenching zone 24.

The indirect heat exchanger 19 may be designed both as water-water and water-air heat exchanger.

What is claimed is:

1. Process for treating washing water from a gas washing operation of an iron ore reduction plant comprising the steps of:

directly contacting the washing water with gas in gas washers arranged in first and second washing stages connected in tandem on the side of the gas;

separately withdrawing the washing water from the first and second stage gas washers;

separating solids from the washing water from the first washing stage in a thickener;

directing the washing water from the thickener into a warm water tank;

directing the washing water from the second washing stage directly into a backward-flow water tank in which it delivers expanding gas rich in carbon dioxide;

directing the expanding gas from the backward-flow water tank into the warm water tank for carbon dioxide enrichment of the washing water in the warm water tank;

cooling the washing water from the warm water tank in a heat exchanger; and feeding the washing water from the heat exchanger and the washing water from the backward-flow water tank back to the gas washers of the first and second washing stages in conditioned and cooled form.

2. Process according to claim 1, wherein the iron ore reduction plant includes a reduction shaft kiln and a meltdown gasifier and each washing stage includes one gas washer for the top gas of the reduction shaft kiln and another gas washer for the gasifier gas of the meltdown gasifier, the gas washers of each washing stage being connected in parallel with one another for washing water passage.

3. Process according to claim 1, further comprising the step of controlling the flow of washing water feed from the thickener into the warm water tank to set water in an overflow channel of the thickener at a high level.

4. Process according to claim 1, further comprising the step of enriching the washing water situated in the warm water tank by the expanding gas from the second washing stage.

5. Process according to claim 1, comprising the step of directing part of the washing water situated in the backward-flow water tank into the warm water tank for carbon dioxide enrichment of the washing water situated in the warm water tank.

6. Process according to claim 1, further comprising the step of diverting part of the washing water situated in the warm water tank, in uncooled form, to quenching zones of the gas washers of the first washing stage prior to cooling the remainder of the washing water from the warm water tank in the heat exchanger.

7. Process according to claim 2, further comprising the step of feeding part of the washing water of the first washing stage, back from a cone of the gas washer for the top gas of the first washing stage to a quenching zone (24) of the gas washer for the top gas of the first washing stage (1).

8. Process according to claim 2, wherein a cooling gas washer for the gasifier gas is located subsequently to the first washing stage, the process further comprising the step of introducing washing water of the cooling gas washer into a quenching zone of the gas washer for the gasifier gas in the first washing stage.

9. Process according to claim 1, further comprising the step of supplementing the washing water from the second washing stage by water vapor which is carried along with in the gas escaping from the first washing stage and which is condensed in the second washing stage.

10. Process according to claim 1, further comprising the step of supplementing the washing water in the backward-flow water tank by a fresh-water feed.

11. Process according to claim 1, further comprising the step of feeding stress-relieving gas escaping from the washing water in the warm water tank to one of: the washed gas escaping from the second washing stage or to a flare system.

12. Process according to claim 1, wherein the step of cooling the washing water from the warm water tank in a heat exchanger comprises cooling the washing water from the warm water tank by an indirect water-water or water-air heat exchange.

* * * * *